3,276,961
PROCESS FOR PREPARING HUMAN INSULIN
Miklos Bodanszky and Josef Fried, Princeton, N.J., assignors, by mesne assignments, to E. R. Squibb & Sons, Inc., New York, N.Y., a corporation of Delaware
No Drawing. Filed Apr. 8, 1963, Ser. No. 271,480
8 Claims. (Cl. 167—75)

This invention relates to a process for preparing human insulin and more specifically to a process for converting animal (not-human) insulin to human insulin.

Prior to this invention, the use of insulin in the treatment of diabetes was well known. The ideal insulin preparation for treatment of human beings would be an insulin derived from humans. Unfortunately, because of the unavailability of commercial quantities of human insulin, insulins derived from pork, beef and other animals have been customarily used.

It is the object of this invention to provide human insulin in commercially feasible quantities.

It is another object of this invention to provide a new process for preparing human insulin from animal insulin.

These objects are accomplished by the process of this invention, which essentially comprises subjecting an animal insulin containing a C-terminal alanine group in the B-chain and either a C-terminal asparagine or aspartic acid in the A-chain to the action of an enzyme, such as carboxypeptidase and trypsin, in the presence of threonine (preferably L-threonine) and recovering the human insulin formed.

Among the suitable animal insulins which may be used in the process of this invention may be mentioned mammalian insulins containing a C-terminal alanine group, such as those insulin derivatives obtained from the pancreas glands of pigs, cattle, whales, fish and others. In addition the corresponding desamido insulins (insulins containing aspartic acid instead of asparagine as the C-terminal amino acid of the A-chain) can also be used. Such desamido insulins include desamido pork insulin and desamido whale insulin in both the zinc free and zinc containing forms.

The insulin may be added to the reaction medium in an amorphous state or in the state of a complex or salt, such as a zinc, protamine, histone or globin complex of salt.

Although any carboxypeptidase enzyme may be used, the preferred enzyme is carboxypeptidase A. To convert the animal insulin to human insulin, the amino acid, L-threonine is also added to the reaction medium.

The reaction is preferably carried out by dissolving the animal insulin in water at a basic pH, preferably a pH of about 7.2 to about 10.5 (optimally about 7.6 to about 9.6), adding L-threonine and the carboxypeptidase, and incubating the resulting mixture at an elevated temperature, preferably a temperature of about 25° C. to about 40° C. The reaction is preferably conducted for a period of time of about ½ hour to about 6 hours, and results in the replacement of the C-terminal alanine group by L-threonine, thereby yielding human insulin.

The resulting human insulin can then be recovered in the conventional manner, as by adjusting the pH of the reaction medium to an acidic pH (preferably about 5.2 to about 5.6) whereby a precipitate of the human insulin is formed, and further purifying the precipitate as more fully described in Example 1, following.

The following examples illustrate the process of this invention (all temperatures being in centigrade):

Example 1

To a suspension of 10 mg. of disopropylfluorophosphate treated carboxypeptidase A (Worthington) in 9 ml. of water is added 1 ml. of 1% sodium bicarbonate at 0° and the pH is adjusted to 8. The enzyme goes into solution. A solution of 600 mg. of crystalline pork zinc insulin is prepared by suspending the insulin in 160 ml. of water and adjusting the pH to 7.8 with 1 N NaOH. To the solution of insulin, 1.2 g. of L-threonine is added and the pH is readjusted to 7.8. The resulting solution is mixed with the above-mentioned enzyme solution. The resulting mixture is incubated at 37° for five hours. The pH is then adjusted to 5.4 with 1 N HCl and the resulting precipitate is collected in centrifuge tubes and washed with water. The precipitate is resuspended in water (40 ml.) and dissolved by the addition of 1 N HCl to pH 2.3. Sodium chloride (3.2 g.) is added and the precipitate which forms is filtered with the aid of Hyflo and washed with an 8% NaCl solution. The filter cake is suspended in water (60 ml.), the pH adjusted to 7 and 20 ml. of acetone is added. The Hyflo is removed by filtration and washed with 25% acetone. To the filtrate and washings is added 3 ml. of sodium citrate buffer (pH 5.4) and 0.6 ml. of a 20% zinc chloride solution. The pH is adjusted to 6 with 1 N NaOH. Crystals soon appear. After one day at room temperature, the mixture is stored in the refrigerator for two days. The crystals are collected and washed with water and finally with acetone. The product is dried in a desiccator to yield about 360 mg. of transformed zinc insulin.

Example 2

Following the procedure of Example 1 but substituting 10 mg. of trypsin instead of carboxypeptidase, the same product is formed.

Example 3

Following the procedure of Example 1 but substituting amorphous pork insulin for the crystalline pork zinc insulin, the same product is obtained.

Example 4

Following the procedure of Example 1 but substituting an equivalent amount of whale insulin for the pork insulin, the same product is obtained.

Example 5

Following the procedure of Example 1 but substituting an equivalent amount of desamido pork insulin for the pork insulin, the same product is obtained. In this case, however, it is preferable to perform the transformation at a higher pH, preferably about pH 9.

This invention may be variously otherwise embodied within the scope of the appended claims.

What is claimed is:
1. A process for preparing human insulin which comprises subjecting an animal insulin containing a C-terminal alanine group in the B-chain and a group consisting of asparagine and aspartic acid as the C-terminal group of the A-chain to the action of an enzyme selected from the group consisting of carboxypeptidase and trypsin in the presence of threonine and recovering human insulin therefrom.

2. A process for preparing human insulin which comprises subjecting pork insulin to the action of carboxypeptidase in the presence of L-threonine.

3. The process of claim 2 wherein the pork insulin is pork zinc insulin.

4. A process for preparing human insulin which comprises subjecting pork zinc insulin in an aqueous solution to the action of carboxypeptidase A in the presence of L-threonine.

5. A process for preparing human insulin which comprises subjecting an animal insulin containing a C-terminal alanine in the B-chain and a grouping consisting of asparagine and aspartic acid as the C-terminal group of the A-chain to the action of an enzyme selected from the group consisting of carboxypeptidase and trypsin at a temperature from about 25° C. to 40° C. in the presence of L-threonine.

6. A process for preparing human insulin which comprises dissolving animal insulin containing a C-terminal alanine in the B-chain and a grouping consisting of asparagine and aspartic acid as the C-terminal group of the A-chain in an aqueous alkaline medium, adding L-threonine and an enzyme selected from the group consisting of carboxypeptidase and trypsin, incubating the resulting mixture at an elevated temperature, and removing human insulin therefrom.

7. A process in accordance with claim 6 wherein the pH of the aqueous alkaline medium is from 7.2 to 10.5.

8. A process in accordance with claim 7 wherein the incubating temperature is from about 25 to 40° C.

References Cited by the Examiner

Medicinal Chemistry, 2nd ed., Burger, chap. 39, Anderson, G. W., pp. 784–5 (1960).

Harris et al.: Journal Am. Chem. Soc., 74 (11), pp. 2945–46 June 5, 1952.

JULIAN S. LEVITT, *Primary Examiner.*

MARTIN J. COHEN, *Assistant Examiner.*